United States Patent
Beez et al.

(10) Patent No.: US 7,151,479 B2
(45) Date of Patent: Dec. 19, 2006

(54) RADAR SENSOR FOR MOTOR VEHICLES

(75) Inventors: Thomas Beez, Weinsberg (DE); Klaus Lehre, Malsch (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/505,402

(22) PCT Filed: Sep. 27, 2002

(86) PCT No.: PCT/DE02/03697

§ 371 (c)(1),
(2), (4) Date: Feb. 16, 2005

(87) PCT Pub. No.: WO03/073125

PCT Pub. Date: Sep. 4, 2003

(65) Prior Publication Data

US 2005/0116854 A1    Jun. 2, 2005

(30) Foreign Application Priority Data

Feb. 22, 2002  (DE) ................................ 102 07 437

(51) Int. Cl.
*G01S 13/93* (2006.01)

(52) U.S. Cl. .................... 342/70; 342/71; 342/117; 342/174

(58) Field of Classification Search ............ 342/70–72, 342/76, 79, 104, 117, 174, 175
See application file for complete search history.

(56) References Cited

U.S. PATENT DOCUMENTS

| | | | | | |
|---|---|---|---|---|---|
| 2,810,905 | A | * | 10/1957 | Barlow ...................... 342/371 |
| 4,143,263 | A | * | 3/1979 | Eichweber ................... 398/170 |
| 4,176,352 | A | * | 11/1979 | Tyler .......................... 342/114 |
| 4,716,298 | A | * | 12/1987 | Etoh ...................... 250/559.38 |
| 4,757,450 | A | * | 7/1988 | Etoh ............................ 701/96 |
| 5,455,589 | A | * | 10/1995 | Huguenin et al. .......... 342/175 |
| 5,579,012 | A | * | 11/1996 | Iwakuni et al. ............. 342/117 |
| 5,621,413 | A | * | 4/1997 | Lempkowski et al. ...... 342/117 |
| 5,680,139 | A | * | 10/1997 | Huguenin et al. .......... 342/175 |
| 5,712,640 | A | * | 1/1998 | Andou et al. ................. 342/70 |
| 6,034,642 | A | * | 3/2000 | Kojima et al. .............. 343/753 |
| 6,037,894 | A | * | 3/2000 | Pfizenmaier et al. .......... 342/70 |
| 6,087,975 | A | * | 7/2000 | Sugimoto et al. ............. 342/70 |
| 6,700,529 | B1 | * | 3/2004 | Matsuura ...................... 342/70 |
| 7,023,376 | B1 | * | 4/2006 | Kuroda et al. ................. 342/70 |
| 7,061,424 | B1 | * | 6/2006 | Kuroda et al. ................. 342/70 |
| 7,068,211 | B1 | * | 6/2006 | Oswald et al. ................. 342/70 |
| 2004/0145513 | A1 | * | 7/2004 | Katayama et al. ............ 342/70 |
| 2004/0239557 | A1 | * | 12/2004 | Tokutsu et al. ............. 342/165 |
| 2005/0116854 | A1 | * | 6/2005 | Beez et al. .................... 342/70 |

(Continued)

FOREIGN PATENT DOCUMENTS

DE    41 29 580    3/1993

(Continued)

OTHER PUBLICATIONS

Winner, "Adaptive Cruise Control", Automotive Electronics Handbook, Ronald K. Jurgen (editor), 2nd Edition, McGraw-Hill (1999) Chapter 30.1.

*Primary Examiner*—John B. Sotomayor
(74) *Attorney, Agent, or Firm*—Kenyon & Kenyon LLP

(57) ABSTRACT

Radar sensor for motor vehicles, having a transmitter and receiver unit whose directional characteristic has multiple lobes, at least one of which is directed parallel to the roadway surface, at least one other lobe being directed obliquely to the roadway surface.

8 Claims, 3 Drawing Sheets

FOREIGN PATENT DOCUMENTS

| | | |
|---|---|---|
| DE | 196 44 164 | 4/1998 |
| DE | 199 41 931 | 3/2001 |
| DE | 199 45 268 | 3/2001 |
| EP | 1 118 872 | 7/2001 |
| WO | WO 97/02496 | 1/1997 |

* cited by examiner

RADAR SENSOR FOR MOTOR VEHICLES

FIELD OF THE INVENTION

The present invention relates to a radar sensor for motor vehicles, having a transmitter and receiver unit whose directional characteristic has multiple lobes, at least one of which is directed parallel to the roadway surface. The present invention further relates to various uses of such a radar sensor.

BACKGROUND INFORMATION

Radar sensors are used in motor vehicles, for example in an Adaptive Cruise Control (ACC) system, and are used within such a system to measure the distance from a vehicle traveling ahead, so that the speed of the subject vehicle can be adapted to that of the vehicle traveling ahead. A description of such an ACC system can be found, for example, in Winner: "Adaptive Cruise Control" in Automotive Electronics Handbook, Ronald K. Jurgen (editor), 2nd Edition, McGraw-Hill (1999), Chapter 30.1. The principle of distance measurement is based on a measurement of the transit time of the radar echo. The Doppler effect also allows a direct measurement of the relative speed of the vehicle traveling ahead, or of another target object that reflects radar waves. The radar sensor for the ACC system typically operates with electromagnetic waves having a frequency of 77 GHz.

In addition, radar sensors are used in motor vehicles as environmental sensors which also monitor the space to the sides of and behind the subject vehicle. These radar sensors operate at a frequency of 24 GHz, for example. The range of application of the present invention is not limited to a specific region of the electromagnetic spectrum, and may also include the visible light region, for example.

Depending on the embodiment, the transmitter and receiver unit for the radar sensor has either separate antennae for transmitting the radar signal and for receiving the echo, or a single antenna for both transmitting and receiving.

For angular localization of the detected objects, a multibeam radar is often used in which the direction of transmission and reception has multiple transmitting and receiving lobes angularly offset with respect to one another, so that they cover a wider angular range around the straight-ahead direction of the vehicle. Separate evaluation of the radar echoes received by the various receiving lobes makes it possible to determine the direction, i.e., the azimuth angle, of the target object. Since the radar sensors used as distance sensors in motor vehicles are used primarily for detecting vehicles traveling ahead in the same lane and in adjacent lanes, the axes of the multiple transmitting and receiving lobes are situated in a common plane approximately parallel to the roadway surface.

In one conventional embodiment of a multibeam radar sensor, each transmitting and receiving lobe is associated with a unique patch antenna as a transmitter/receiver. The patch antennae are laterally offset with respect to one another in the focal plane of a shared optical lens. The radar waves emitted from each patch are bundled by the lens, which is made of a dielectric material, for example plastic, which is transparent to the radar waves, and are radiated in a direction specified by the position of the patch in the focal plane. During receiving, the same lens is used for refocusing the received echo from the particular receiving lobe onto the associated patch. Depending on the embodiment of the sensor, transmission and reception may be performed at the same time, or with a time delay.

SUMMARY

One object of the present invention is to increase the application possibilities for a radar sensor of the aforementioned type.

For a radar sensor having at least one lobe which is oriented parallel to the roadway surface, this object may be achieved by directing at least one other lobe obliquely to the roadway surface.

Since the roadway surface always has a certain roughness, it forms numerous small reflectors which reflect a portion of the incident radar beams back to the radar sensor. For conventional radar sensors as well, a weak echo from the roadway surface is always received as "background"; this echo is relatively weak, however, since the slightly divergent radar beam has not expanded enough to impinge on the roadway surface until it is a relatively large distance from the sensor. In the case of the radar sensor according to the present invention, a stronger and clearer radar echo is received from the roadway surface as a result of one of the lobes being directed obliquely to the roadway surface so that it impinges on the roadway surface earlier. This radar echo provides additional information which may be used in various ways in the regulation and control systems of modern motor vehicles.

For example, the radar echo from the roadway surface may be used for directly measuring the ground speed of the vehicle. Heretofore, the speed of a motor vehicle has generally been measured with the aid of wheel speed sensors. For converting the wheel speed into the vehicle speed, however, the effective wheel diameter must be known, and it is not possible to accurately determine the latter because of fluctuations in the tire pressure, load, etc. In addition, the speed measurement may be distorted by wheel slip. For this reason, the speed measurements using wheel speed sensors fail primarily in driving situations in which individual, or all, wheels of the vehicle experience significant slip or lock-up. However, it is precisely in such situations that accurate information about the ground speed of the vehicle could often be important, such as for the electronic regulation of vehicle dynamics or for recording the events immediately before an accident.

The present invention may allow, for example by making use of the Doppler effect, independent measurement of the ground speed of the vehicle which is undistorted by such interfering influences, thereby making it possible to improve the operational safety and accuracy of numerous systems that require a measurement of the vehicle speed. Moreover, combining the radar measurement with the conventional measurement via wheel speed sensors allows mutual error monitoring of the various measuring systems.

Although the principle of measuring the ground speed of a vehicle via a radar sensor is conventional, the advantage of the present invention is that this speed measurement does not require an additional radar sensor, but, rather, is achieved by only a minor modification of a radar sensor, present in the vehicle anyway and used as such for other purposes, for example an ACC system.

In one use of the radar sensor according to the present invention in an ACC system, the advantageous possibility is also provided for using the radar lobe directed onto the roadway surface for continuously checking the vertical alignment of the radar sensor. A correct alignment of the radar sensor in the vertical direction is of greater importance in ACC systems because the desired localization depth of the sensor is not obtained unless radar lobes are aligned precisely at the height of the other vehicles, and thus approximately parallel to the roadway surface. Otherwise, there is a risk that the radar lobes either pass over vehicles at a distance when the alignment is too high, or strike the ground before reaching the vehicle at a distance when the alignment is too low. Since by using the lobe directed onto the roadway surface it is possible to measure not only the absolute speed of the vehicle but also the distance at which this radar lobe impinges on the roadway, the angular alignment of the sensor may be checked based on this distance and the known height of the radar sensor above the roadway surface.

It is also possible to improve the accuracy and reliability of an automatic blindness recognition system of the sensor using the radar sensor according to the present invention. Although the radar waves are able to penetrate rain and fog better than the human eye, the radar sensor may be blinded due to various causes. Possible reasons for such blinding, besides the sensor misalignment already mentioned, are errors or breakdowns of the sensor electronics, and in particular, deposits of snow, slush, or ice on the radar antenna or on the lens which bundles the radar beams. Blindness recognition systems for ACC radar sensors are described in German Patent Application Nos. DE 196 44 164 and DE 199 45 268. In the system described in the latter application, the echoes from vehicles traveling ahead and other targets on the roadway or on the side of the roadway detected by the radar sensor are evaluated for this purpose. One disadvantage of this system, however, is that blinding of the sensor is erroneously identified in a very low-reflecting environment, such as when driving on a seldom traveled road in barren areas, where there are also no reflecting targets on the roadside. In contrast, the present invention has the advantage that the radar echo from the roadway surface is practically always present, and at a known intensity of the emitted signal also has an intensity that is predictable within certain limits. If the intensity of the echo from the roadway surface takes on abnormally low values, this is a very meaningful indicator of blinding of the radar sensor. Because the channel scanning the roadway surface and the channels responding to other vehicles are integrated into the same radar sensor, an absence of the radar echo from the roadway indicates that in all probability the sensor as a whole has been blinded.

In one example embodiment, the lobe directed onto the roadway surface is generated by an additional radar source, a patch antenna, for example, which is situated above the optical axis of the sensor and whose beam is therefore deflected through the lens onto the roadway surface. In this case the echo from the roadway surface is also received mainly by the offset patch, thereby simplifying a targeted evaluation of this signal.

In another example embodiment, the radar beam which is generated by one or more radar sources and directed parallel to the roadway surface is partially deflected onto the roadway surface with the aid of a condenser which acts as a beam splitter. The condenser may be a specially designed lens which has two lens zones with different refractive properties, similar to bifocal eyeglasses. Of course, this may also be achieved by an appropriately designed reflector. In these cases, the radar echo from the roadway surface is evaluated via the channels which are also used for evaluating the signals from other radar targets.

The present invention is not limited to a specific design of the radar sensor or transmitter/receiver principle, but, rather, may be used for all common sensor types with appropriate modification of the electronic evaluation system or software.

BRIEF DESCRIPTION OF THE DRAWINGS

Exemplary embodiments of the present invention are explained in greater detail below, with reference to the figures.

DETAILED DESCRIPTION OF EXAMPLE EMBODIMENTS

Figure 1:
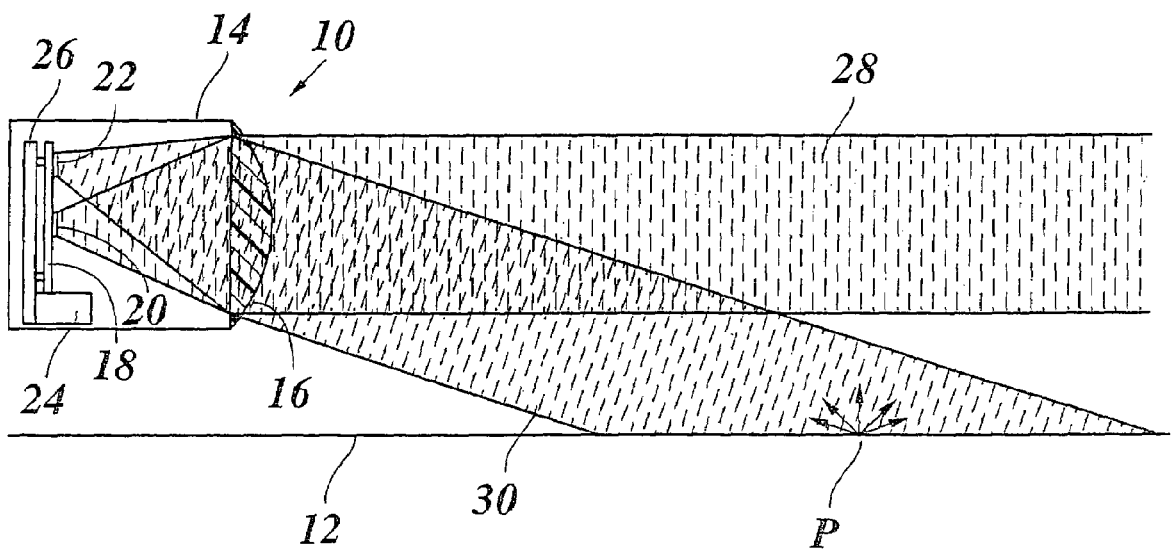
FIG. 1 shows a schematic illustration of a radar sensor according to an example embodiment of the present invention.

Radar sensor 10 shown in FIG. 1 is installed on the front side of a motor vehicle, not shown, at a specified distance above roadway surface 12, and has a housing 14 which is closed off on the front side by a lens 16 (condenser element) made of a plastic that is transparent to radar waves. Multiple patches 20, 22, which are used as radar sources and fed by a microwave oscillator 24 via microwave conductors are mounted inside housing 14, on a substrate 18 approximately in the focal plane of lens 16.

In the example shown, patches 20, 22 are simultaneously used as receiving antennae for the radar echo. The received signals are evaluated by an electronic evaluation system mounted on a plate 26 behind substrate 18.

Figure 2:
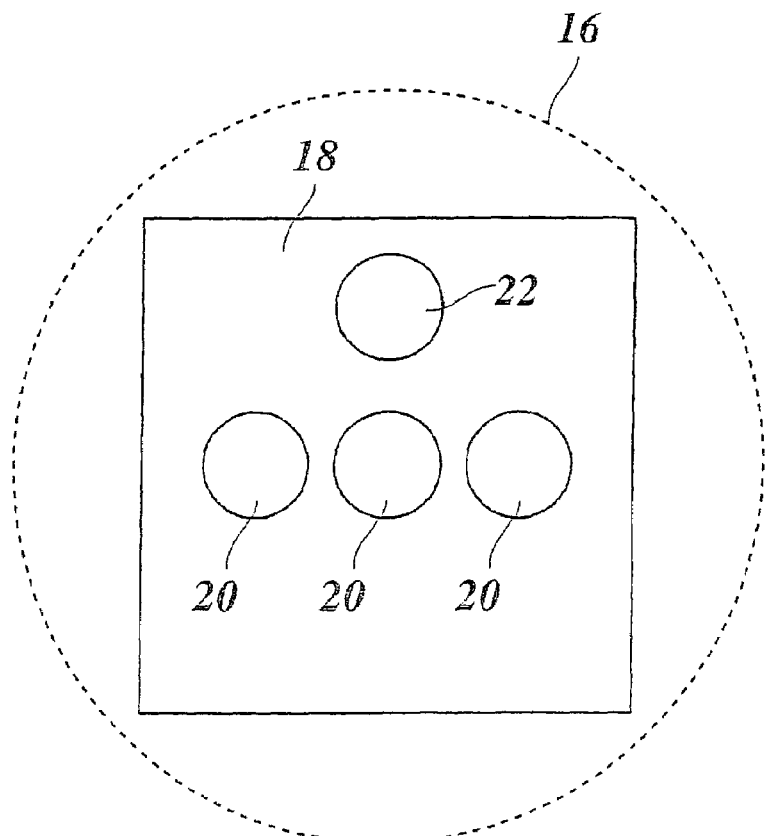
FIG. 2 shows a schematic front view of the radar sensor according to FIG. 1.

The system of patches 20, 22 on substrate 18 is illustrated in FIG. 2. The outline of lens 16 is represented by a dashed line. Three patches 20 are situated next to one another on a line which runs horizontally, and thus parallel to roadway surface 12. The middle patch of these patches 20 is centered on the optical axis of lens 16. In contrast, patch 22 is offset above this optical axis. For the transmission function of radar sensor 10, lens 16 is used as a condenser which bundles the divergent beams emitted by patches 20, 22. Each of patches 20 thus generates a lobe 28 in the form of an approximately parallel bundle of rays which is directed parallel to roadway surface 12. In contrast, patch 22 generates a lobe 30, again in the form of an approximately parallel bundle of rays, which is directed obliquely to roadway surface 12.

Due to the imaging characteristics of lens 16, the three lobes 28 generated by patches 20 are also angularly displaced with respect to one another in the horizontal plane. Only lobe 28 of center patch 20 is centered on the optical axis of lens 16, whereas the axes of the lobes generated by patches 20 on either side diverge slightly. The three lobes 28 overlap one another, thus forming a multibeam radar having a localization region fanned out over its width. The three lobes 28 are used for detecting vehicles traveling ahead, in the same lane and in adjacent lanes. Whenever a statement is made for purposes of simplification in the present application that lobes 28 are directed "parallel to the roadway surface," this means that the angle of inclination of lobes 28 is optimized for the detection of vehicles in a localization region that is relevant for the distance measurement.

When the radar waves from overlapping lobes 28 are reflected by a radar object, the direction of the radar target may be determined, at least approximately, by comparing the intensities of the waves received by the three patches 20. In this manner it is possible to distinguish, for example, between a vehicle traveling ahead in the same lane and vehicles in the adjacent lanes. Depending on the distance and curvature of the roadway, lobes 28 are also able to detect radar targets on the side of the roadway.

Lobe 30 generated by patch 22 impinges on roadway surface 12 at a relatively short distance in front of the vehicle. Since the roadway surface has a certain roughness, the radar waves are reflected in different directions. A portion of the reflected radar waves returns to lens 16 and is received by patch 22. Based on the transit time and the Doppler shift of the radar echo received by patch 22, it is thus possible to determine the distance between radar sensor 10 and approximate point of incidence P of lobe 30 on roadway surface 12, as well as the components of the speed of the vehicle (of radar sensor 10) relative to roadway surface 12 along the axis of lobe 30. The evaluation of this information is described in greater detail below.

Figure 3:
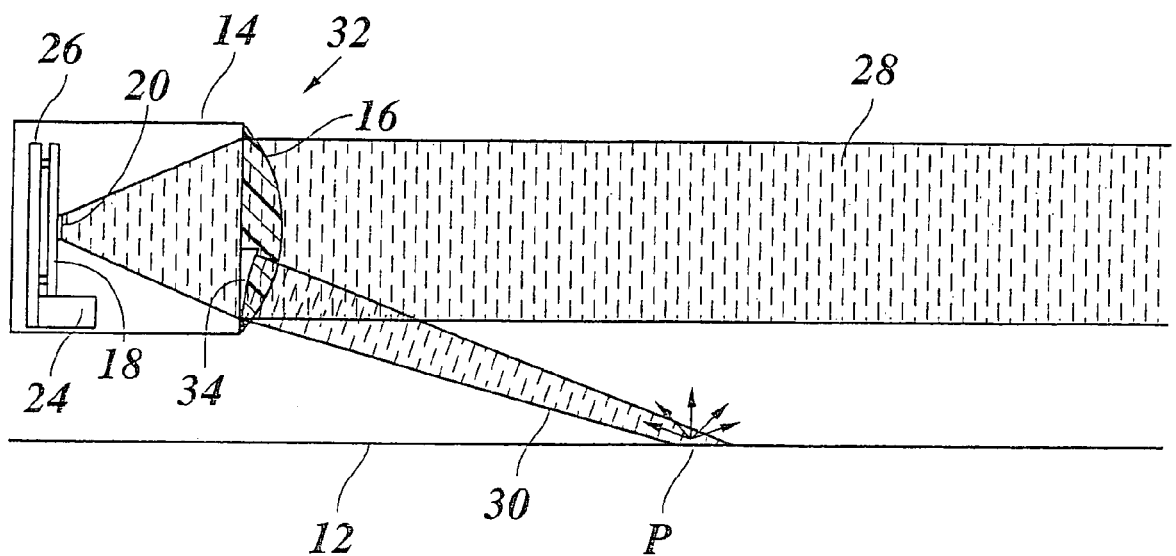
FIG. 3 shows a schematic illustration of a radar sensor according to another example embodiment.
Figure 4:
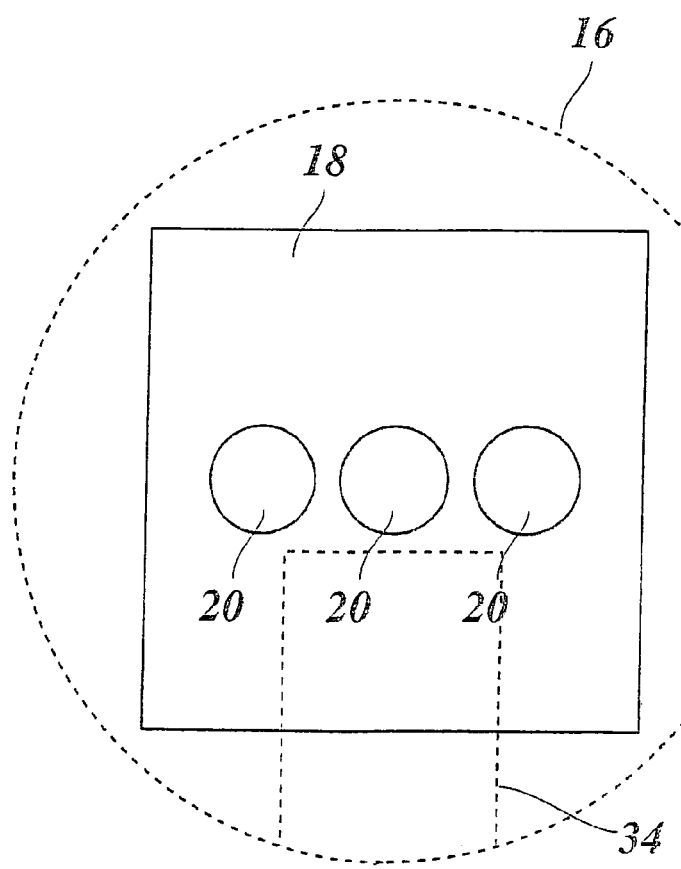
FIG. 4 shows a schematic front view of the radar sensor according to FIG. 3.

As a further embodiment, FIGS. 3 and 4 illustrate a radar sensor 32 which has only three patches 20 situated on a horizontal line. For generating lobe 30 which is directed obliquely to roadway surface 12, lens 16, which may have the overall design of a planoconvex lens, has in this instance a recess on the planar side which defines a lens zone 34 having refraction characteristics that are different from the rest of the lens. Lens zone 34 acts both as a focusing lens (here with a focal distance that is different from the rest of the lens) and a prism through which a portion of the radar beams emitted by patches 20 is refracted and deflected to roadway surface 12.

As shown in FIG. 4, lens zone 34 is formed only in the center region of lens 16, so that the lens zone is impinged on specifically by the beams from center patch 20. The radar beams reflected by roadway surface 12 at point of incidence P are again focused on center patch 20 by prismatic lens zone 34.

However, the larger portion of the radar beams emitted by center patch 20 forms the center lobe of lobes 28 which are directed parallel to the roadway surface. When this lobe impinges on a radar target, a vehicle traveling ahead, for example, overall localization signals for two objects, namely, the vehicle traveling ahead and the roadway surface at point P, are obtained in the evaluation of the signal from center patch 20. If center lobe 28 impinges on additional radar targets, a correspondingly greater number of objects is localized in the evaluation of the signal from center patch 20. The electronic evaluation system of radar sensor 32, like conventional radar sensors, is designed to distinguish between multiple radar targets, even if they are detected using the same lobe, and to separately determine their distances and relative speeds. Thus it is also possible, using radar sensor 32, to measure the distance from point of incidence P and the associated relative speed. However, when determining the direction of radar targets that are impinged on by lobes 28, consideration should be given to the attenuation of the intensity of center lobe 28, because a portion of the beams is deflected into lobe 30.

Figure 5:
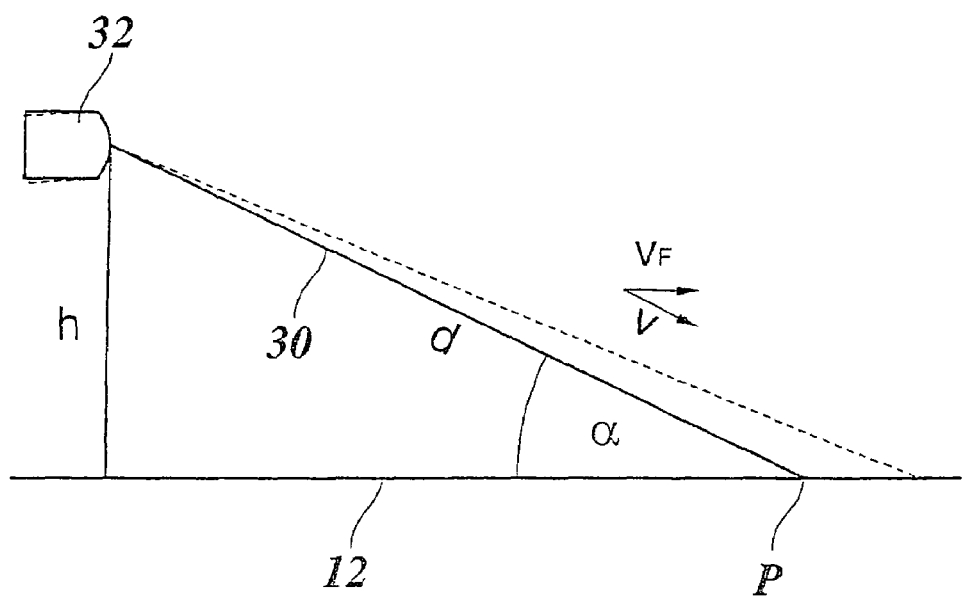
FIG. 5 shows a sketch illustrating one method for measuring the vehicle speed and the vertical alignment of the radar sensor.

The evaluation of the information obtained using lobe 30 is described with reference to FIG. 5.

Speed v of radar sensor 10 relative to roadway surface 12 in the direction parallel to the axis of lobe 30 may be measured based on the Doppler effect. However, since this direction forms angle α with the horizontal, the magnitude of v is not exactly the same as ground speed $v_F$ of the vehicle.

A more accurate value for $v_F$ may be obtained as follows. Height h of radar sensor 10 above roadway surface 12 is specified by the point of attachment of radar sensor 10 to the vehicle, and is therefore known with relatively great accuracy. Distance d between radar sensor 10 and point of incidence P along the line of sight, and thus along the axis of lobe 30, may be determined from the transit time of the radar echo. Thus, $\alpha = \sin^{-1}(h/d)$ and $v_F = v \cos \alpha$ In practice, the deflection of lobe 30 is selected as a function of height h in such a way that lobe 30 impinges on roadway surface 12 at a relatively short distance, thereby ensuring that the echo generated by lobe 30 actually originates from the roadway surface and not from, for example, movable radar targets. In making such a selection of point of incidence P, at the same time angle of incidence α is large enough so that the radar waves reflected by the roadway surface back to radar sensor 10 have a sufficiently high intensity.

The measurement of distance d may be used in other ways. As indicated by dashed lines in FIG. 5, distance d is relatively sensitive to a misalignment of radar sensor 10 with respect to the inclination to the vertical. As already described, for a radar sensor for an ACC system such a misalignment may result in a decrease in the localization depth for vehicles traveling ahead, up to the point of complete blinding of the radar sensor. Normal distance d, corresponding to a correct alignment of the radar sensor, is known for a given vehicle, since this distance is uniquely specified by height h and the angle between lobes 28 and 30. Measured distance d will fluctuate somewhat about the normal value while driving, since roadway surface 12 will not always be flat, but rather may have bumps and depressions, and because height h and the inclination of the sensor also fluctuate due to springlike motions of the vehicle body. However, when continuously measuring distance d, the average value of the measured distances must correspond to the normal value given correct alignment of the sensor. If the average value is found to deviate from the normal value over the long term, this may be recognized as a misalignment of radar sensor 10, so that either an automatic realignment is performed or a warning message is sent to the driver, or, if needed, the ACC system is switched off.

The evaluation of the radar echo received from roadway surface 12 may also be used in general for blindness recognition for radar sensor 10, even if the blindness is caused not by misalignment but by other factors, for example by a breakdown of the electronic evaluation system or an interfering deposit of dirt, snow, or ice on lens 16. In these cases, the radar echoes from roadway surface 12 as well as from other radar targets are either entirely absent or become unstable or significantly attenuated. For the radar targets on the roadway or roadside which are detectable using lobes 28, however, it is not possible to determine whether the absence of signals has been caused by blinding of the sensor, or is simply due to the fact that no radar targets are present. In comparison, the reflections from roadway surface 12 have the advantage that their presence may in fact always be assumed. The absence or attenuation of these reflections—in conjunction with other indicators, if necessary—therefore represents an important indicator for blinding of radar sensor 10.

Figure 6:
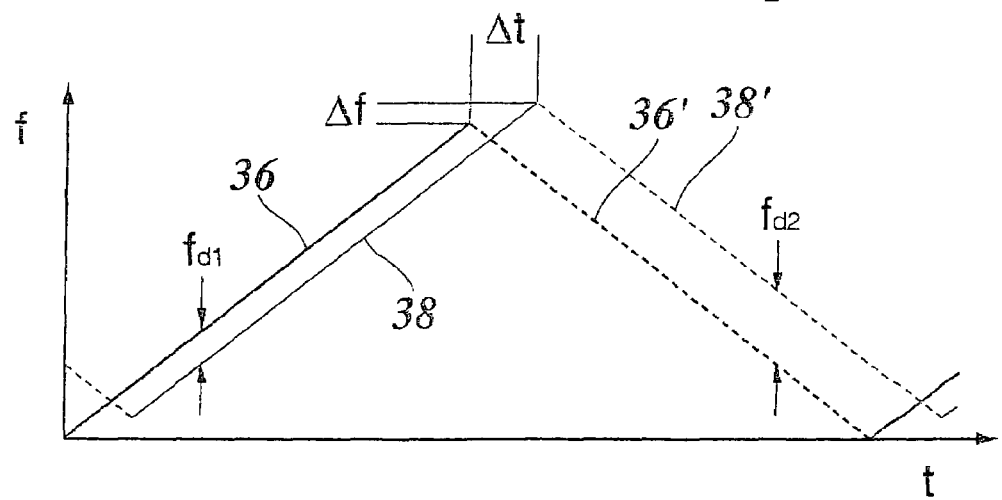
FIG. 6 shows a frequency/time diagram for explaining the measurement principle of an FMCW sensor.
Figure 7:
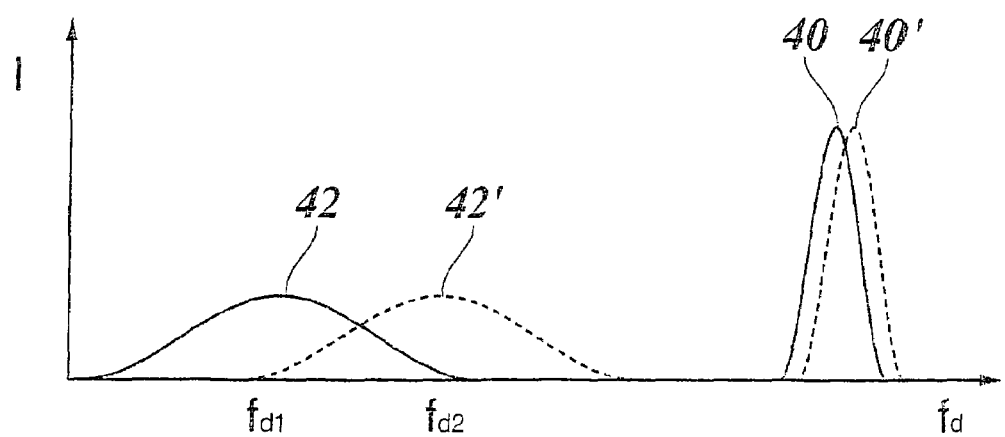
FIG. 7 shows an intensity/frequency diagram for explaining the evaluation of the received signals for an FMCW radar.

The evaluation of the radar signals with respect to blindness recognition is illustrated in FIGS. 6 and 7, using the example of a frequency modulated continuous wave (FMCW) radar. In such a radar system the radar waves are emitted continuously, but with a variable frequency, by radar sensor 32. In FIG. 6, curve 36, 36' drawn as a heavy line shows the time dependence of frequency f of the radar waves emitted by patches 20. Frequency f is periodically varied according to a ramp function having an ascending ramp 36 (solid line) and a descending ramp 36' (dashed line). In FIG. 6, thinner lines are used to illustrate frequency curve 38, 38' for the associated radar echo from roadway surface 12. This curve has the same ramps 38 and 38', but is specified by a time offset Δt determined by the distance of the object, and by a frequency offset Δf determined by the Doppler shift.

In radar sensor 32, the emitted wave is mixed with the received radar echo for each patch, resulting in a beat signal having a frequency $f_d$ corresponding to the frequency difference between the emitted waves and the received waves. The frequency spectrum is formed from this beat signal, using the fast Fourier transform.

FIG. 7 uses solid and dashed lines to show an example of two frequency spectra which could be obtained using, for example, center patch 20 in FIG. 4 when a single vehicle traveling ahead is present in the localization region of lobe 28. Difference frequency $f_d$ then has a relatively sharp peak 40 or 40' for the echo from lobe 28, and thus from the vehicle traveling ahead, and a flatter, broader peak 42 or 42' for the echo from lobe 30, and thus from roadway surface 12. Peaks 40, 42 represented by solid lines are obtained along ascending ramp 36 for the emitted signal, and peaks 40', 42' represented by dashed lines are obtained along descending ramp 36' for the emitted signal. Difference frequency $f_d$ is critically dependent on the product of time offset Δt (signal transit time) and the slope of the ramp, but along ascending flank 36 the difference frequency is decreased by the absolute value of the Doppler frequency, and along descending flank 36' it is increased by the absolute value of the Doppler frequency (for a positive Doppler shift to higher frequencies, corresponding to an approach toward the radar target). The average value of frequencies $f_{d1}$ and $f_{d2}$ for peaks 42, 42', respectively, in FIG. 7 therefore corresponds to the signal transit time and thus indicates distance d, whereas half the difference between these two frequencies indicates the Doppler shift and thus the magnitude and algebraic sign of speed v. A similar relationship applies for the frequencies of peaks 40, 40', and the distance and relative speed of the vehicle traveling ahead.

A difference between simultaneously received peaks 40, 42 or 40', 42' is simplified by the fact that a peak obtained from lobe 28 corresponds to greater object distances and thus higher difference frequencies, whereas lobe 30 has already impinged on the roadway surface at a short distance. For vehicles traveling ahead, the relative speed and thus the Doppler shift will also be less, whereas for peaks 42, 42' the Doppler shift corresponds to the absolute ground speed of the vehicle. Furthermore, peaks 42, 42' are flatter and broader because the echo from rough roadway surface 12 as a rule is relatively weak, and because this roadway surface represents a reflection target that is not sharply localized, but, rather, spatially distributed. When lobe 28 detects multiple radar targets, ambiguities may result which in practice are eliminated by periodically varying the ramp slopes.

The overall intensity, i.e., the intensity of peak 42 (or 42') integrated over all frequencies $f_d$, varies as a function of the condition of roadway surface 12, but within a certain fluctuation range will be proportional to the intensity of the emitted radar waves, provided that the radar waves are transmitted and received in an undisturbed manner. A comparison of this overall intensity of peaks 42 or 42' with a suitably chosen threshold value, which is variable as a function of the operating conditions as necessary, thus allows blinding of the radar sensor to be determined with a high degree of reliability.

With regard to a highest possible signal intensity and sharpness of peak 42, it is practical for lobe 30 to be designed as narrowly as possible, or to be focused on expected point of incidence P. This may be achieved according to, for example, the embodiment of radar sensor 32 shown in FIG. 3 by the fact that a slightly smaller focal distance is selected for lens zone 34 than for the rest of the lens. This measure also improves the accuracy in the determination of the angle of misalignment. For radar sensor 10 according to FIG. 1, it is possible to achieve a corresponding focusing of lobe 30 by using an additional lens in the beam path of patch 22.

What is claimed is:

1. A radar sensor for motor vehicles, comprising:
   a transmitter and receiver unit, a directional characteristic of the transmitter and receiver unit having multiple lobes, at least one of the lobes being directed parallel to a roadway surface, and at least one other one of the lobes being directed obliquely to the roadway surface, wherein the transmitter and receiver unit includes multiple radar sources which are situated offset with respect to one another approximately in a focal plane of the condenser element, one of radar sources configured to generate the lobe directed obliquely to the roadway surface.

2. The radar sensor as recited in claim 1, further comprising:
   a condenser element including one of a lens or a reflector, the condenser element configured to bundle emitted radar waves into the lobes.

3. The radar sensor as recited in claim 2, wherein the condenser element includes a beam splitter which deflects a portion of the emitted radar waves into the lobe which is directed obliquely to the roadway surface.

4. A radar sensor for motor vehicles, comprising:
   a transmitter and receiver unit, a directional characteristic of the transmitter and receiver unit having multiple lobes, at least one of the lobes being directed parallel to a roadway surface, and at least one other one of the lobes being directed obliquely to the roadway surface; and
   a condenser element including one of a lens or a reflector, the condenser element configured to bundle emitted radar waves into the lobes, wherein the condenser element has a different focal distance for the lobe which is directed obliquely to the roadway surface than for the other lobes.

5. A radar sensor for motor vehicles, comprising:
   a transmitter and receiver unit, a directional characteristic of the transmitter and receiver unit having multiple lobes, at least one of the lobes being directed parallel to a roadway surface, and at least one other one of the lobes being directed obliquely to the roadway surface; and a condenser element including one of a lens or a reflector, the condenser element configured to bundle emitted radar waves into the lobes, wherein the condenser element includes a lens which has a lens zone having refraction characteristics that differ from the rest of the lens.

6. A method for checking an alignment of a radar sensor; comprising:

providing a transmitter and receiver unit, a directional characteristic of the transmitter and receiver unit having multiple lobes, at least one of the lobes being directed parallel to a roadway surface, and at least one other one of the lobes being directed obliquely to the roadway surface;

determining a distance, on the roadway surface, between a radar sensor of the transmitter and receiver unit and a point of incidence of the lobe which is directed obliquely to the roadway surface; and determining a misalignment of the radar sensor based on a deviation of the determined distance from a vehicle-specific nominal value.

7. A method for blindness recognition for a radar sensor, comprising:

providing a transmitter and receiver unit, a directional characteristic of the transmitter and receiver unit having multiple lobes, at least one of the lobes being directed parallel to a roadway surface, and at least one other one of the lobes being directed obliquely to the roadway surface; and measuring an intensity of a radar echo reflected by the roadway surface for the lobe which is directed obliquely to the roadway surface, to recognize blindness.

8. A method of using a radar sensor, comprising:

providing a transmitter and receiver unit, a directional characteristic of the transmitter and receiver unit having multiple lobes, at least one of the lobes being directed parallel to a roadway surface, and at least one other one of the lobes being directed obliquely to the roadway surface; and performing at least one of the following:

measuring a ground speed of a motor vehicle using the transmitter and receiver unit, checking an alignment of a radar sensor by determining a distance, on the roadway surface, between the radar sensor of the transmitter and receiver unit and a point of incidence of the lobe which is directed obliquely to the roadway surface, and determining a misalignment by the radar sensor based on a deviation of the determined distance conform a vehicle-specific nominal value, and measuring an intensity of a radar echo reflected by the roadway surface for the lobe which is directed obliquely to the roadway surface to recognize blindness.

* * * * *